United States Patent [19]

McCarthy et al.

[11] Patent Number: 6,041,240
[45] Date of Patent: Mar. 21, 2000

[54] CLEAR CHANNEL SELECTION SYSTEM FOR A CORDLESS TELEPHONE

[75] Inventors: Dennis Ronald McCarthy, Syracuse; John Mark Fossaceca, Baldwinville; Maneck Behram Kapadia, Liverpool, all of N.Y.

[73] Assignee: Thomson Consumer Electronics Inc., Indianapolis, Ind.

[21] Appl. No.: 08/814,622

[22] Filed: Mar. 10, 1997

Related U.S. Application Data

[63] Continuation of application No. 08/491,102, Jun. 16, 1995, abandoned, which is a continuation of application No. 08/353,583, Dec. 8, 1994, abandoned, which is a continuation of application No. 08/177,670, Jan. 5, 1994, abandoned.

[51] Int. Cl.[7] .................................................. H04Q 7/32
[52] U.S. Cl. ........................................ 455/464; 455/421
[58] Field of Search ...................................... 455/462, 464, 455/403, 450, 452, 421, 67.1, 67.3

[56] References Cited

U.S. PATENT DOCUMENTS

| | | | |
|---|---|---|---|
| 4,628,152 | 12/1986 | Akerberg | 379/60 |
| 4,656,653 | 4/1987 | Oda et al. | 379/63 |
| 4,694,485 | 9/1987 | Iwase | 379/61 X |
| 4,768,219 | 8/1988 | Yamagata et al. | 379/61 |
| 4,894,856 | 1/1990 | Nakanishi et al. | 379/58 |
| 5,044,010 | 8/1991 | Frenkiel et al. | 455/464 |
| 5,109,527 | 4/1992 | Akerberg | 379/60 |
| 5,197,093 | 3/1993 | Knuth et al. | 455/464 |
| 5,237,603 | 8/1993 | Yamagata et al. | 379/61 |
| 5,287,400 | 2/1994 | Saegusa | 379/61 |
| 5,297,203 | 3/1994 | Rose et al. | 379/62 X |
| 5,428,669 | 6/1995 | McCarthy | 379/61 |

FOREIGN PATENT DOCUMENTS

| | | | |
|---|---|---|---|
| 2176974 | 1/1987 | United Kingdom | H04B 1/44 |
| 2184920 | 7/1987 | United Kingdom | H04Q 7/02 |
| 2250665 | 6/1992 | United Kingdom | H04B 7/24 |
| 2261141 | 5/1993 | United Kingdom | H04K 1/00 |

*Primary Examiner*—William G. Trost
*Attorney, Agent, or Firm*—Joseph S. Tripoli; Peter M. Emanuel; Robert D. Shedd

[57] ABSTRACT

A radio frequency (RF) signal transmitter/receiver system comprises a pair of transmitter/receiver units. A microcomputer-based RF carrier detect system determines when an RF signal is present or absent. The RF carrier detect system is also responsive to noise interference signals at or near its currently-tuned receiving channel. In periods of inactivity, the RF signal receiver monitors its currently-tuned channel and upon detection of noise interference or upon a determination that the currently-tuned channel is occupied, initiates a fast scan operation to identify an unoccupied and relatively interference-free channel, and transmits a command to its paired transmitter/receiver unit causing it to tune to the newly-identified unoccupied channel.

9 Claims, 6 Drawing Sheets

CLEAR CHANNEL SELECTION SYSTEM FOR A CORDLESS TELEPHONE

This is a continuation of application Ser. No. 08/491,102, filed Jun. 16, 1995, now abandoned, which is a continuation of application Ser. No. 08/353,583, filed Dec. 8, 1994, now abandoned, which is a continuation of application Ser. No. 08/177,670, filed Jan. 5, 1994, now abandoned.

FIELD OF THE INVENTION

The subject invention concerns, in general, the field of cordless telephones capable of operating on either of at least two cordless telephone channels, and relates specifically to an apparatus for detecting and avoiding interference on a particular channel.

BACKGROUND OF THE INVENTION

Some known cordless telephone systems employ a radio frequency (RF) carrier detect system in which the base unit checks for the presence of an RF carrier during the period when the cordless telephone unit is in the inactive "on-hook" state. These known systems use a hardware analog carrier detect circuit.

A microcomputer-based RF carrier detection arrangement is disclosed in U.S. patent application Ser. No. 08/171,353 (Fossaceca, et al.) filed Dec. 22, 1993, and assigned to the same assignee. In that application it was pointed out that, unfortunately, during the manufacturing process, an adjustment procedure must be performed on the hardware analog carrier detect circuitry in every cordless telephone set in order to ensure correct triggering at the specified thresholds. This adjustment procedure tends to be difficult, time consuming, and often causes the detection of the RF carrier to be unreliable.

Moreover, since the carrier detect circuitry is in the base unit of the cordless telephone set, these systems are only capable of detecting interference at, or near, the handset transmitter frequencies (i.e., the base unit receiver frequencies). Interference occurring at, or near, base unit transmitter frequencies will go undetected, and may lead to disrupted communication between the base unit and the handset.

One might think that RF carrier detect circuitry should also be installed in the handset to alleviate this problem, but two separate obstacles have heretofore prevented such a simple solution. First, another hardware analog RF carrier detect circuit had to be added to the handset, increasing the cost of manufacturing, further complicating the design, and increasing manufacturing assembly time as well as the calibration time of each unit. In addition, the handset is a free-standing unit, and as such, exhibits a poor ground-reference, which adds to the difficulties of adjusting the RF carrier detector threshold potentiometer reliably.

Second, cordless telephone handsets are intended to be portable, and consequently are battery-operated. Ideally, one would like the handset to draw no power at all in the inactive mode. Unfortunately, the receiver in the handset must be energized, and thus drawing power, in order to receive incoming calls via transmission from the base unit. In order to conserve power, a common solution to this problem is to repetitively "pulse" the handset "on" and "off" in a short duty cycle to look for incoming RF transmissions from the base unit. The duty cycle for the handset is typically 40–60 milliseconds (ms) "on" and several hundred milliseconds "off". Not all of the "on" portion of the duty cycle is available for use, however, because 15–20 ms is required for the PLL and microprocessor circuitry to stabilize after being "powered-up", and up to an additional 5 ms is required for the hardware analog RF carrier detect circuitry to stabilize. In the worst case, the additional 5 ms stabilization time would unacceptably dissipate 25% of the available active monitoring period of the handset.

SUMMARY OF THE INVENTION

A radio frequency (RF) signal transmitter/receiver system comprises a pair of transmitter/receiver units. Each of the units is capable of operating on one of a plurality of RF channels, and each receiver includes an input for receiving a radio frequency signal, the radio frequency signal being subject to periods of absence. A microcomputer-based RF carrier detect circuit determines when an RF signal is present or absent. The RF carrier detect circuit is also responsive to noise interference signals at or near its currently-tuned receiving channel. In periods of inactivity, the RF signal receiver monitors its currently-tuned channel and upon detection of noise interference or upon a determination that the currently-tuned channel is occupied, initiates a fast scan operation to identify an unoccupied and relatively interference-free channel, and transmits a command to its paired transmitter/receiver unit causing it to tune to the newly-identified unoccupied channel.

DETAILED DESCRIPTION OF THE EMBODIMENT

Figure 1:
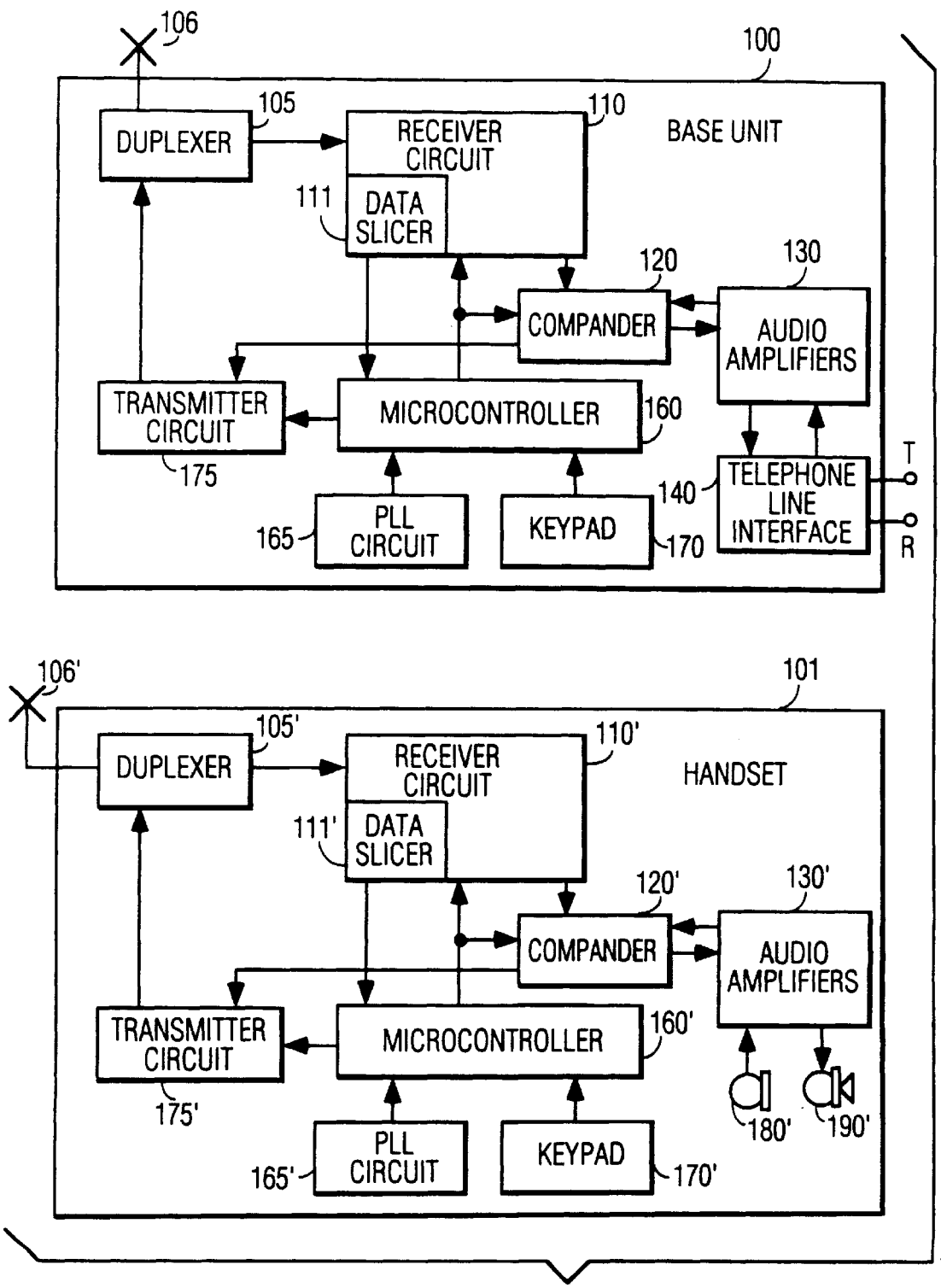
FIG. 1 shows a simplified block diagram of a base unit and a handset of a cordless telephone apparatus suitable for use with the invention.

Referring to FIG. 1, a cordless telephone base unit 100 includes a Duplexer 105 for receiving radio frequency (RF) signals from, and applying RF signals to, an antenna 106. Duplexer 105 may be a type DPX 46/49-B10 duplexer manufactured by Soshin Electric Ltd. Signals received from duplexer 105 are applied to a receiver circuit 110 for detection, processing and amplification.

Receiver circuit 110 provides baseband audio signals to a compander 120 for spectral expansion, which in turn applies the audio signals to an audio amplifier 130. Audio amplifier 130 applies amplified audio signals to the tip (T) and ring (R) terminals of a telephone network via a telephone interface unit 140.

Incoming telephone signals are received by telephone interface unit 140 and applied to compander 120 via audio amplifier 130. Compander 120 compresses the amplitude of the audio signals to increase their noise immunity and applies the compressed signals to a transmitter circuit 175. Transmitter 175 modulates the audio signals onto an RF carrier and applies the RF signals to duplexer 105 for transmission via antenna 106.

Interfacing to the telephone network, dialing operations, channel selection and communication with a handset 101 of the cordless telephone apparatus is under control of a microcontroller 160. Microcontroller 160 may be a microprocessor or a microcomputer or a dedicated controller integrated circuit. Microcomputer 100 controls a phaselocked loop (PLL) circuit 165 for frequency selection, and receives data input by user via a keyboard 170.

Elements of handset 101 of FIG. 1 bearing similar reference numerals to elements of base unit 100 FIG. 1 serve the same function and need not be explained again. Audio amplifiers 130' of handset 101 receive input signals from a mouthpiece microphone 180' and provide output audio signals to an earpiece speaker unit 190'.

U.S. patent application Ser. No. 08/171,353 discloses that carrier detect function can be performed by the microcontroller in the base unit by causing that microcontroller to examine the frequency content of the detected baseband audio signal. It is herein recognized that when both the base unit and the handset employ a microcomputer-based RF carrier detect arrangement that, advantageously, the transmit frequencies of both units may be monitored during inactive periods in order to move to a different channel to avoid interference from noise or previous occupant of a cordless telephone channel. No additional 5 ms delay is required for stabilization of a hardware carrier detect circuit because no hardware carrier detect circuit is used.

Figure 2A:
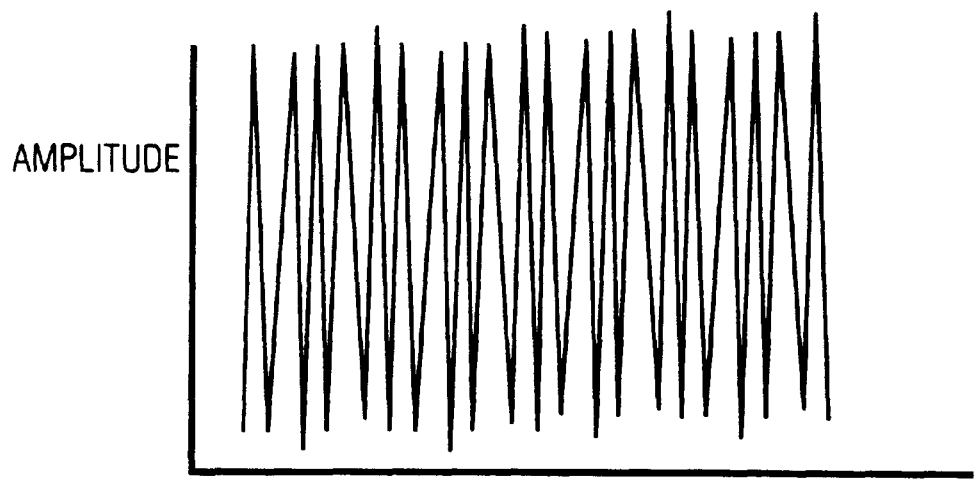
FIGS. 2a–2c show waveforms useful in understanding the invention.
Figure 2B:
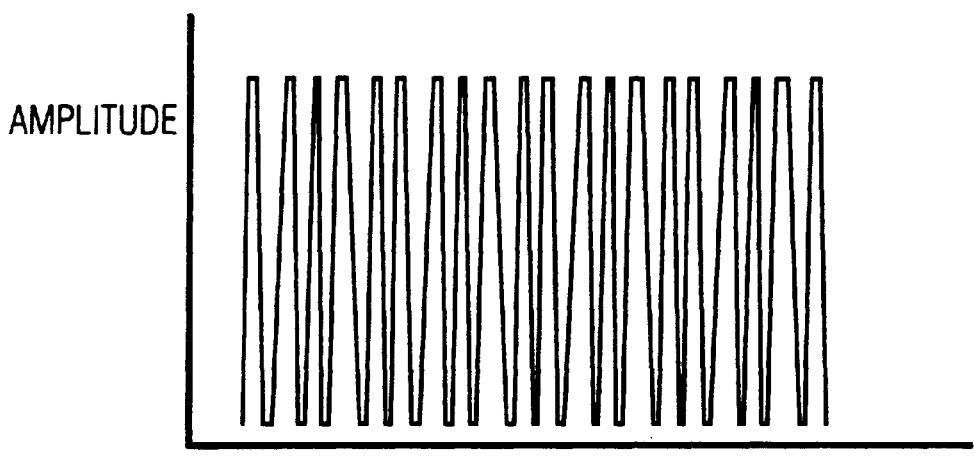

For simplicity, the operation of the receiver in handset 101 only, will be described, the operation of the receiver in base unit 100 being essentially the same. Receiver 110' includes a data slicer circuit 111' which receives a portion of the baseband signal and slices it at predetermined amplitude levels to produce a binary signal. Data slicer 111' applies this binary signal directly to microcontroller 160' via a line 115'. FIG. 2a is a simplified illustration of a waveform representing band limited white noise which would be present in the baseband signal received by data slicer 111' in the absence of an RF carrier. Note that the waveform of FIG. 2a contains random noise pulses having frequencies generally higher than the frequency range of speech signals. FIG. 2b is a simplified illustration of the waveform of FIG. 2a after data slicing. The waveform of FIG. 2b is typical of a signal which would be present on line 115' in the absence of an RF carrier.

Figure 2C:
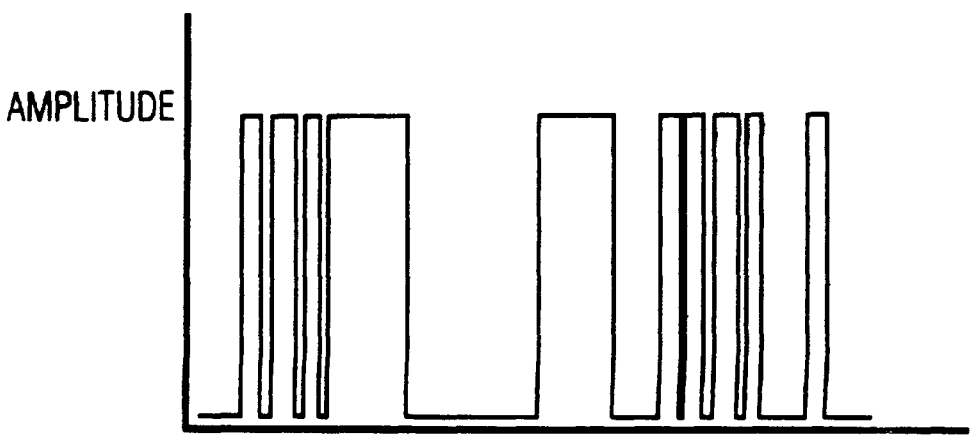

It has been found that human speech tends to exhibit frequencies clustered around 1 kHz with relatively long periods of no signal at all due to silence caused by breaks in the conversation. Thus, the simplified waveform of FIG. 2c illustrates a signal with lower frequency content (i.e., longer pulsewidths) than that of the random noise shown in FIG. 2b. It is herein recognized the microcontroller 160' is capable of sampling the signal on line 115' quickly enough to make a determination of presence or absence of noise, which is indicative of absence or presence of RF carrier, respectively. Microcomputer 160' samples the baseband signal every 118 microseconds which enables microcontroller 110' to identify audio frequencies up to approximately 8.5 kHz.

The subject invention combines a new method to choose a channel which is likely to be clear, with the features of the microcomputer-based RF carrier detect arrangement of U.S. patent application Ser. No. 08/171,353 and with a "fast scan" arrangement previously used in GE cordless telephones bearing model numbers 2-9632, 2-9626, 2-9615, and 2-9635, and manufactured by Thomson Consumer Electronics, Inc. Indianapolis, Ind., to provide an arrangement which detects and avoids previously occupied cordless telephone channels and channels which are noisy due to interference on either the handset receive channels or the base unit receive channels. The system according to the subject invention has been found to be more reliable than prior art systems in that it is less likely to experience communication loss between handset and base unit.

In prior art cordless telephone sets, a loss of communication is typically overcome by returning the handset to the base unit cradle to reestablish a common communication channel. In the subject apparatus, however, there is no need to return the handset to the base unit cradle, because the above-mentioned fast scan arrangement (described in detail below) operates to ensure that the handset and base unit are tuned to the same channel. This is felt to be an important feature in that it enables a cordless telephone to operate with a remote recharge cradle which requires no telephone outlet of its own, and which can therefore be placed in substantially any room of a typical home.

As noted above, the handset is designed to conserve power. In this regard, the handset detects interference in the passive STANDBY mode of operation which is an inactive or idle mode in which the handset turns on its receiver for a very brief period (approximately 40–60 ms), looks for incoming signals, and then, upon finding none, shuts down for several hundred milliseconds. The handset will only power up fully upon determining that a carrier exists on its currently-tuned channel. If a carrier exists, and if the carrier is a transmission from the base unit which is paired with the handset, then the handset transmits instructions (explained in detail below) to the base unit and enters fast scan mode which will ensure a high probability of a successful link-up of handset and base unit on a new channel. The system is designed to cease attempting to link-up on a new channel after a predetermined number of unsuccessful attempts, and will only be reactivated after a system reset, or by the user causing an off-hook condition followed by an on-hook condition.

The following describes three different interference avoidance systems which differ only in the relative complexity of program for choosing a new channel which is likely to be clear. Preferably, each of these three systems uses a microcomputer-based RF carrier detect arrangement, however, the use of a hardware carrier detect circuit, while not preferred, is still considered acceptable for practicing the invention.

Interference Avoidance System 1

Figure 3:
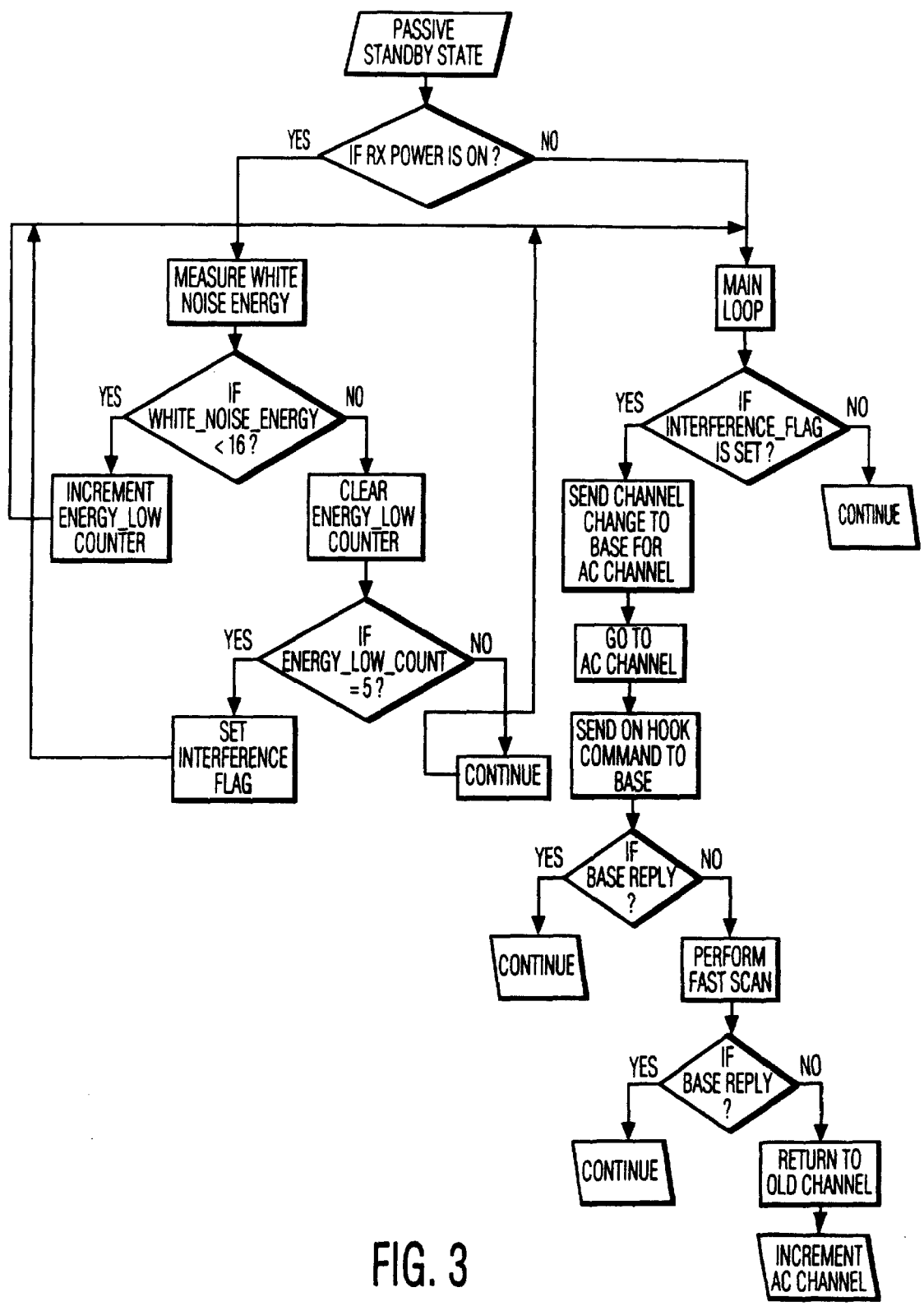
FIGS. 3–6 are illustrations of flowcharts showing relevant portions of the control program for the microcontrollers of FIG. 1.

In the passive STANDBY state, (i.e., on-hook) handset 101 periodically turns on its receiver to search for communication from base unit 100. During that time, the microcomputer-based RF carrier detect system measures the amount of white noise energy received. If the white noise content is low, the system increments a counter. After a predetermined number of such low white noise detections is reached (e.g., 5), the handset determines that interference is present on its currently-tuned receive channel (i.e., the currently-selected base unit transmit channel). Upon detecting such interference, the handset simply assumes that the next consecutive channel is clear, issues a change channel command to the base unit, and moves to the next channel. The channel which the handset moves to is called the Auto Clear (AC) channel, the designation AC in this instance is not to be confused with the designation AC meaning "Alternating Current". After moving to the AC channel the handset issues an on-hook command to the base unit. The base unit should reply to this command on the AC channel. If the base unit fails to reply in a predetermined period of time (e.g., several milliseconds), then the handset will perform a fast scan operation by issuing a fast scan "go to" command on every channel, moving rapidly from one channel to the next without waiting for a reply from the base unit. It is expected that the "go to" commands will cause the base unit to move to the AC channel. After issuing the "go to" command on all channels, the handset moves to the AC channel and listens for a reply from the base unit. If a reply is received, then the fast scan operation was successful, if not the handset returns to the original channel, increments the AC channel (because the originally-selected AC may not be clear) and begins again. If after incrementing the AC channel through all available channels, the system has failed to link-up, the system ceases attempting to reestablish communications until the next handset reset, or until an on-hook condition followed by off-hook condition occurs. A flowchart showing the details of the above-described interference avoidance system 1 is illustrated in FIG. 3. A high level language program for implementing the flowchart of FIG. 3 is shown in TABLE 1.

Interference Avoidance System 2

As previously described, during the STANDBY mode of operation, handset 101 periodically turns on its receiver to search for a communication signal from base unit 100. During that time, the microcomputer-based RF carrier detect system measures the amount of white noise energy received. If the white noise content is low, the system increments a counter. After a predetermined number of such low white noise detections is reached (e.g., 5), the handset determines that interference is present on its currently-tuned receive channel (i.e., the currently-selected base unit transmit channel). Upon detecting such interference, the handset simply assumes that the next consecutive channel is clear, issues a change channel command to the base unit, and moves to the next channel (i.e., the AC channel). After moving to the AC channel handset 101 waits for a reply from base unit 100.

Figure 4:
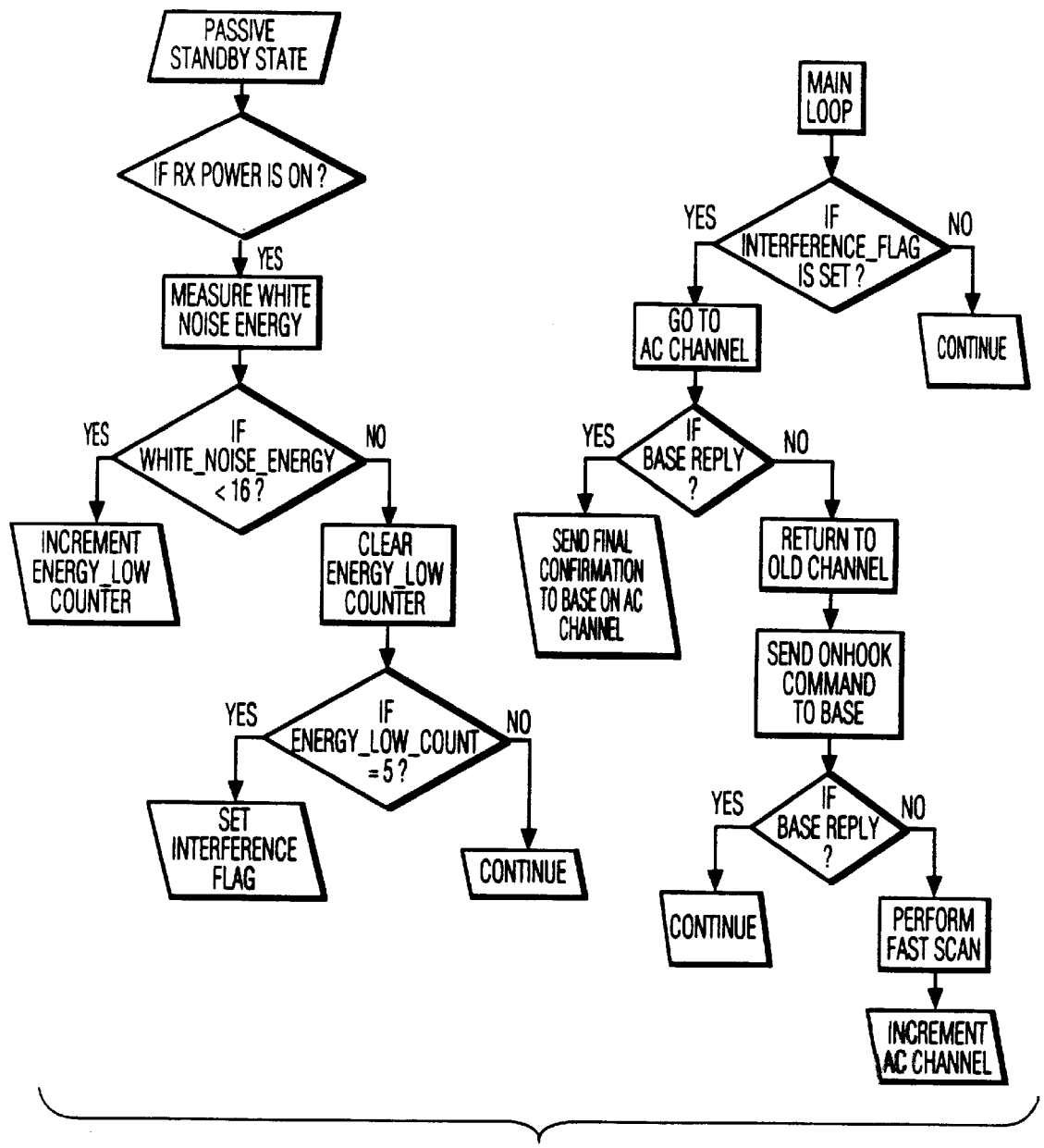

Base unit 100, upon receiving a channel change command from handset 101, moves to the AC channel and briefly monitors the incoming signal. If base unit 100 measures a high white noise content, then it determines that the AC channel is clear, and sends a reply to handset 101. If, on the other hand, base unit 100 determines that the AC channel is occupied, it returns to the original channel without issuing a reply. Handset 101, upon receiving a reply on the AC channel sends a final confirmation to base unit 100 via the AC channel, to which base unit 100 responds. If no reply is received, then handset 101 returns to the original channel, issues an on-hook command and waits for a reply. If no reply is received then handset 101 performs a fast scan operation to force base unit 100 back to the original channel. Likewise, once base unit 100 has moved to the AC channel and replied, it expects to receive a final confirmation signal from handset 101. If a final confirmation signal is not received, then base unit 100 returns to the original channel. On each subsequent attempt, after a failure to move to the AC channel, handset 101 increments the AC channel. If after incrementing the AC channel through all available channels, the system has failed to link-up, the system ceases attempting to reestablish communications until the next handset reset, or until an on-hook condition followed by off-hook condition occurs. A flowchart showing the details of the above-described interference avoidance system 2 is illustrated in FIG. 4. A high level language program for implementing the flowchart of FIG. 4 is shown in TABLE 2.

Interference Avoidance System 3

As previously described, during the STANDBY mode of operation, handset 101 periodically turns on its receiver to search for a communication signal from base unit 100. During that time, the microcomputer-based RF carrier detect system measures the amount of white noise energy received. If the white noise content is low, the system increments a counter. After a predetermined number of such low white noise detections is reached (e.g., 5), handset 101 determines that interference is present on its currently-tuned receive channel (i.e., the currently-selected base unit transmit channel). Upon detecting such interference, the handset briefly checks that the next consecutive channel is clear, issues a change channel command to the base unit, and moves to the next channel (i.e., the AC channel). After moving to the AC channel handset 101 waits for a reply from base unit 100.

Figure 5:
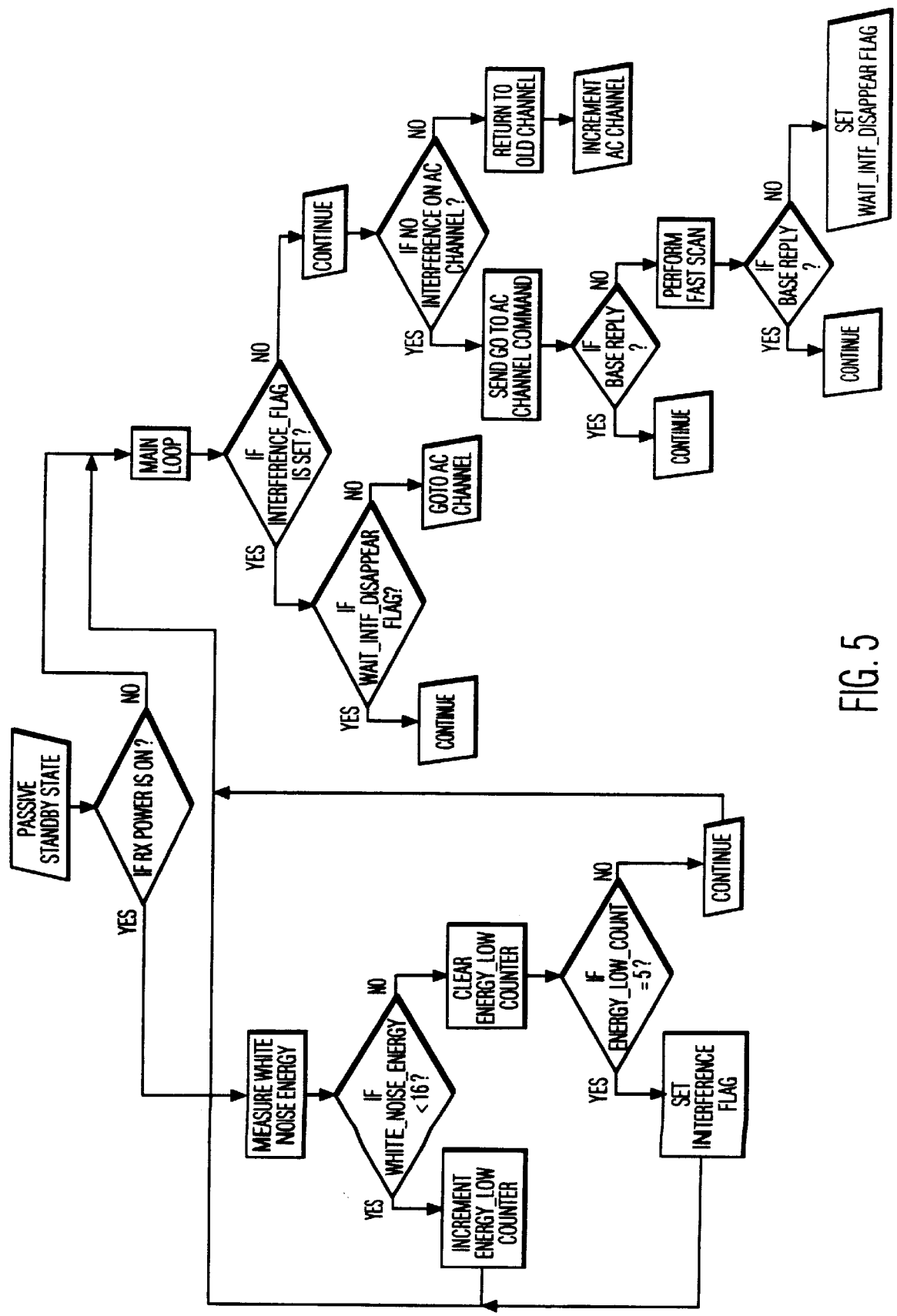

If no reply is received, then handset 101 performs a fast scan operation by issuing a "go to" command on each channel and rapidly changing to the next channel without waiting for a reply, in order to force base unit 100 to move to the AC channel. If a reply is then received on the AC channel, the link-up was successful. On each subsequent attempt, after a failure to link-up on the AC channel, handset 101 increments the AC channel. If after incrementing the AC channel through all available channels, the system has failed to link-up, the system ceases attempting to reestablish communications until the next handset reset, or until an on-hook condition followed by off-hook condition occurs. At the next off-hook condition, handset 101 sends the AC channel imbedded in the off-hook command to base-unit 100. If no reply is received on the AC channel, to the of-hook command then the handset issues a series of warning tones to the user, returns to the original channel and shuts down. A flowchart showing the details of the above-described interference avoidance system 3 is illustrated in FIG. 5. A high level language program for implementing the flowchart of FIG. 5 is shown in TABLE 3.

Base Unit Initiative

It is herein recognized that base unit 100 can also initiate an attempt to change to the AC channel upon its detection of interference on its currently-tuned receive channel while "on-hook". In that case, base unit 100 sends a "wake-up" signal to handset 101, followed by an Auto_Clear_Request command. Handset 101, if it is in the STANDBY mode, and if it is within range, responds by activating its Auto_Clear routine (i.e., one of interference avoidance routines 1, 2, or 3) in the same way as if handset 101 had detected the inference itself. Thus, base unit 100 can initiate a sequence which will result in communications being established between base unit 100 and handset 101 on an AC channel.

As noted above, employment of the microcomputer-based RF carrier detection arrangement facilitates the use of the invention in cordless telephone handsets by eliminating the adjustment of hardware components. It is important to note that in a hardware-based system the threshold adjustment is a factory adjusted potentiometer. This necessarily limits the carrier detect circuitry to a single "hard-wired" decision threshold value (i.e., presence of carrier, or no carrier present). This limitation requires that the carrier detect circuitry use the same threshold value whether on-hook or off-hook. It is herein recognized that the threshold value is a software variable which can be changed easily in a microcomputer-based RF carrier detect arrangement in accordance with the current operating mode of the system. For example, while on-hook the RF carrier detect arrangement is used for automatic clear channel selection, and should be set to a low value to detect low levels of interference. Whereas, while off-hook the RF carrier detect arrangement is used for out-of-range detection and warning, and should be set to a higher threshold for detecting the absence of carrier when the signal strength drops to a level at which conversation becomes difficult due to noisy audio signals.

Figure 6:
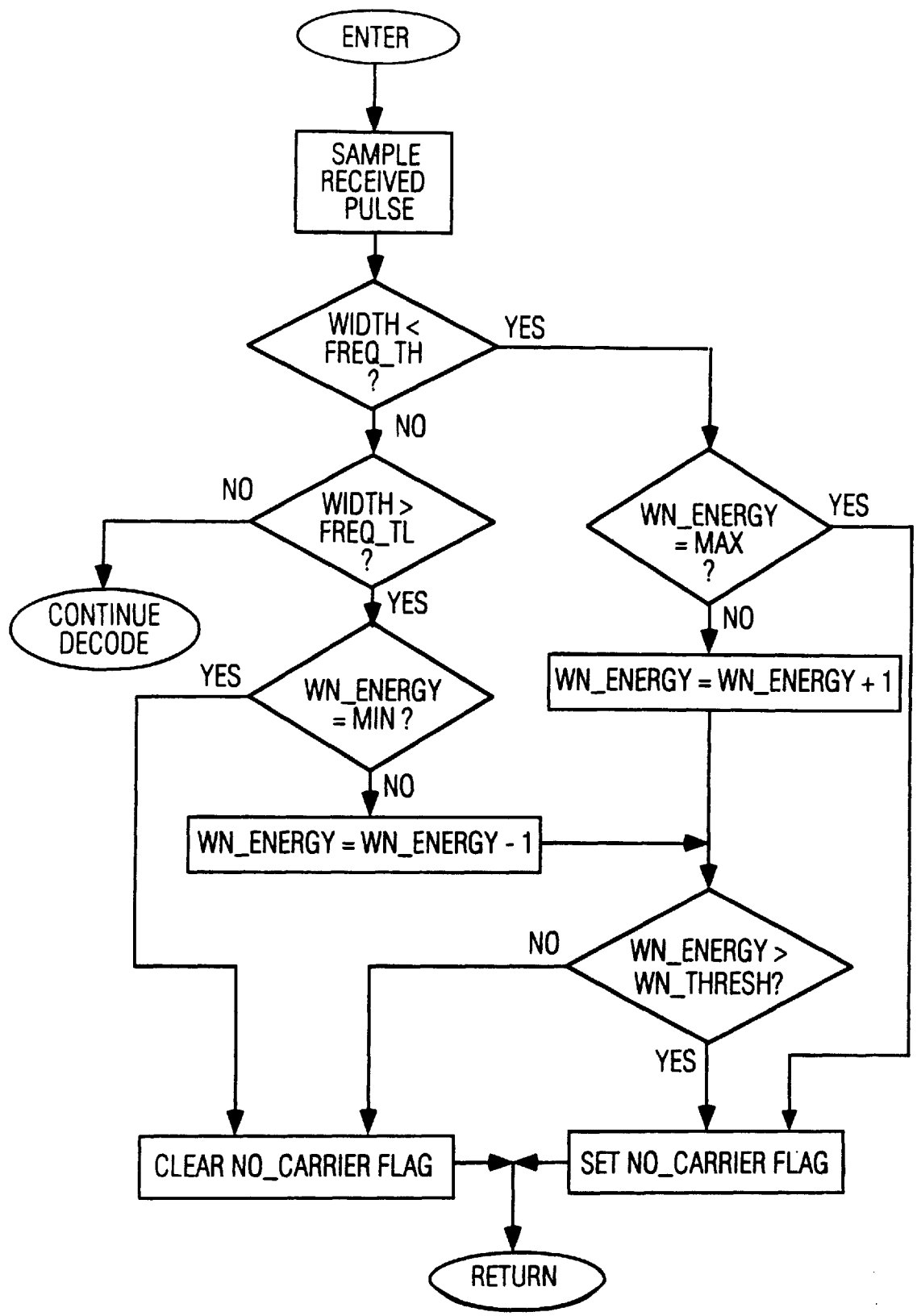

The computer-based RF carrier detect arrangement is U.S. patent application Ser. No. 08/171,353 is briefly explained with reference to the flowchart of FIG. 6. In normal operation (i.e., off-hook) microcontroller 160' monitors the baseband signal stream to detect digital data which may accompany the received analog audio signals. A frequency filtering algorithm varies the value of a "noise energy" counter in response to the white noise content of the received audio signal. If the count of the noise energy counter exceeds a predetermined value then a determination is made that no carrier exists on the currently selected receiving channel.

The audio signal present on line 115' is sampled, and the value in a counter WIDTH is checked to see if it is less than a predetermined high frequency threshold, higher than the highest speech frequency. If so, the value in WIDTH is indicative of the detection of high audio frequencies (i.e., white noise). If the count is not indicative of high audio frequency content, then it is checked to determine if the pulsewidths detected are indicative of frequencies greater than a predetermined low frequency threshold value, for example 1 kHz (as noted above, human speech tends to be clustered around 1 kHz in frequency). If the frequencies detected are not above 1 kHz, then long pulsewidths (i.e., low audio frequencies) have been detected, a condition which is indicative of speech and/or silence, and routine is exited to continue the decoding of the audio signal in the usual manner.

If, on the other hand, the frequency content is not clearly high (i.e., noise) or clearly low (i.e., audio) then a counter WN_ENERGY (i.e., white noise energy) is checked to see if it equals a minimum value. if so the NO_CARRIER FLAG is cleared, indicating the presence of an RF carrier, and the routine is exited. If WN_ENERGY is not at its minimum value, it is decremented, because a longer pulsewidth (i.e., lower frequency has just been detected). The lower value in WN_ENERGY is checked to see if it exceeds a predetermined threshold. If so, then a NO_CARRIER FLAG is set. If not, the NO_CARRIER FLAG is cleared. In either case the routine is then exited via a RETURN instruction.

If a determination was made that high audio frequencies are present, then the YES path is taken and the content of WN_ENERGY is checked to see if it is at its maximum value. If so, the YES path is taken, the NO_CARRIER FLAG is set, and the routine is exited. If WN_ENERGY is not at its maximum value, it is incremented, because a high frequency was just detected. The higher value in WN_ENERGY is checked to see if it exceeds a predetermined threshold. If so, then the NO_CARRIER FLAG is set. If not, the NO_CARRIER FLAG is cleared. In either case the routine is then exited via a RETURN instruction.

Thus, there has been disclosed, a microcontroller-based clear channel selection system useful in, but not limited to, the cordless telephone environment. Advantageously, through the use of the subject invention, reliability is improved by virtue of the fact that both the base unit receive channels and the handset receive channels are monitored for interfering signals, whether from other cordless telephones or from other sources of RF noise such as radio stations, power lines, or household appliances.

The terms "microcontroller" and "microcomputer", are used interchangeably herein, and are intended to include microprocessors, microcomputers, dedicated control integrated circuits, and the like.

TABLE 1

| | |
|---|---|
| 2 | {HIDE ALL} |
| 3 | Clear Scan Channel System - IA1 |
| 5 | Passive standby state. |
| 6 | If rx power is on ? |
| 7 | (Yes) Measure white noise energy. |
| 8 | |
| 9 | If white_noise_energy < 16 ? |
| 10 | (Yes) increment energy_low counter. |
| 11 | (No) clear energy_low counter. |
| 13 | If energy_low_count = 5 ? |
| 14 | (Yes) set interference flag. |
| 15 | (No) continue. |
| 16 | ?end |
| 17 | ?end |
| 18 | ?end |
| 20 | Main Loop. |
| 21 | if interference_flag is set ? |
| 22 | (Yes) send channel change to base for AC channel. |
| 23 | goto AC channel. |
| 24 | send onhook command to base. |
| 25 | if base reply ? |
| 26 | (Yes) continue. |
| 27 | (No) perform fast Scan. |
| 28 | if base reply ? |
| 29 | (Yes) continue. |
| 30 | (No) return to old channel. |
| 31 | increment AC channel. |
| 32 | ?end |
| 33 | ?end |
| 34 | (No) continue. |
| 35 | ?end |

TABLE 2

| | |
|---|---|
| 2 | {HIDE ALL} |
| 3 | Clear Scan Channel System - IA2 |
| 5 | Passive standby state. |
| 6 | If rx power is on ? |
| 7 | (Yes) Measure white noise energy. |
| 8 | |
| 9 | If white_noise_energy < 16 ? |
| 10 | (Yes) increment energy_low counter. |
| 11 | (No) clear energy_low counter. |
| 13 | If energy_low_count = 5 ? |
| 14 | (Yes) set interference flag. |
| 15 | (No) continue. |
| 16 | ?end |
| 17 | ?end |
| 18 | ?end |
| 20 | Main Loop. |
| 21 | if interference_flag is set ? |
| 22 | (Yes) goto AC channel. |
| 23 | if base reply ? |
| 24 | (Yes) send final confirmation to base |
| 25 | on AC channel. |
| 26 | (No) return to old channel. |
| 27 | send onhook command to base. |
| 28 | if base reply ? |
| 29 | (Yes) continue. |
| 30 | (No) perform Fast Scan. |
| 31 | increment AC channel. |
| 32 | ?end |
| 33 | ?end |
| 34 | (No) continue. |
| 35 | ?end |

TABLE 3

| | |
|---|---|
| 2 | {HIDE ALL} |
| 3 | Clear Scan Channel System - IA3 |
| 5 | Passive standby state. |
| 6 | If rx power is on ? |
| 7 | (Yes) Measure white noise energy. |
| 8 | |

TABLE 3-continued

```
 9    If white_noise_energy < 16 ?
10           (Yes) increment energy_low counter.
11           (No) clear energy_low counter.
13    If energy_low_count = 5 ?
14           (Yes) set interference flag.
15           (No) continue.
16    ?end
17    ?end
18    ?end
20    Main Loop.
21    if interference_flag is set ?
22           (Yes) if wait_intf_disappear flag ?
23                        (Yes) continue.
24                        (No) goto AC channel.
25                  ?end
26           (No) continue.
27           If no interference on AC channel?
28                  (Yes) send goto AC channel command.
29                  if base reply ?
30                        (Yes) continue.
31                        (No) perform Fast Scan.
32                        if base reply ?
33                              (Yes) continue.
34                              (No) set wait_intf_disappear flag.
35                        ?end
36                  ?end
37                  (No) return to old channel.
38                  increment AC channel
39           ?end
40    ?end
```

What is claimed is:

1. A cordless telephone set exhibiting an off-hook state for enabling communication via an external telephone network, and an on-hook state, said cordless telephone set comprising:

a base unit operating on one of a plurality of cordless telephone channels;

a handset operating on said one of said plurality of cordless telephone channels;

each of said cordless telephone channels including a first radio frequency for communication from said handset to said base unit and a second radio frequency for communication from said base unit to said handset;

said base unit including an input for receiving a signal from said handset at said first radio frequency of a first cordless telephone channel;

said handset including an input for receiving a signal from said base unit at said second radio frequency of said first cordless telephone channel:

said base unit including a microprocessor for controlling said base unit, a portion of said microprocessor functioning as a signal detector circuit responsive, during said on-hook state, to a baseband signal derived from said first radio frequency signal for producing a first output signal indicative of said first channel being occupied, or indicative of a noise signal being present on said first channel;

said handset including a microprocessor for controlling said handset, a portion of said microprocessor functioning as a signal detector circuit responsive, during said on-hook state, to a baseband signal derived from said second radio frequency signal for producing a second output signal indicative of said first channel being occupied, or indicative of a noise signal being present on said first channel;

said signal detector circuit of said base unit and said signal detector circuit of said handset each having a threshold of detection of a first value in said on-hook state and of a second value, higher than said first value, in said off-hook state;

said signal detector of said base unit and said signal detector of said handset operating in said off-hook mode for detecting baseband digital control signals;

said microcomputer in said handset causes a transmission of a channel change command to said base unit and causes said handset to change to the same new channel in response to said second output signal.

2. A cordless telephone set exhibiting an off-hook state for enabling communication via an external telephone network, and an on-hook inactive state, said cordless telephone set comprising:

a base unit operating on one of a plurality of cordless telephone channels;

a handset operating on said one of a plurality of cordless telephone channels;

each of said cordless telephone channels including a first radio frequency for communication from said handunit to said base unit and a second radio frequency for communication from said base unit to said handunit;

said base unit including an input for receiving a signal from said handset at said first radio frequency of a first cordless telephone channel;

said base unit including a microcomputer for controlling said base unit, a portion of said microcomputer functioning as a signal detector circuit responsive, during said on-hook state, to a baseband signal derived from said first radio frequency signal for producing a first output signal indicative of said first channel being occupied, or indicative of a noise signal being present on said first channel;

said handset including a microcomputer for controlling said handset, a portion of said microcomputer functioning as a signal detector circuit responsive, during said on-hook state, to a baseband signal derived from said second radio frequency signal for producing a second output signal indicative of said first channel being occupied, or indicative of a noise signal being present on said first channel;

said signal detector circuit of said base unit and said signal detector circuit of said handset each having a threshold of detection of a first value in said on-hook state and of a second value, higher than said first value, in said off-hook state;

said signal detector of said base unit and said signal detector of said handset operating in said off-hook mode for detecting baseband digital control signals;

said microcomputer in said base unit causing a transmission of a channel change command to said handset and causing said base unit to change to the same new channel in response to said first output signal;

said microcomputer in said handset causing transmission of a channel change command to said base unit and causing said handset to change to the same new channel in response to said second output signal.

3. The cordless telephone set of claim 1, wherein each of said microcomputers monitors frequency content of a demodulated audio baseband signal to determine that the channel is occupied, the channel is noisy, or the channel is suitable for use.

4. The cordless telephone set of claim 2, wherein each of said microcomputers monitors frequency content of a demodulated audio baseband signal to determine that the channel is occupied, the channel is noisy, or the channel is suitable for use.

5. A cordless telephone set exhibiting an off-hook state for enabling communication via an external telephone network, and an on-hook state, said cordless telephone set comprising:
- a base unit operating on one of a plurality of cordless telephone channels under control of a controller;
- a handset operating on said one of said plurality of cordless telephone channels under control of a controller;
- each of said cordless telephone channels including a first radio frequency for communication from said handunit to said base unit and a second radio frequency for communication from said base unit to said handunit;
- said base unit including a controller for controlling said base unit, a portion of said controller functioning as a signal detector responsive, during said on-hook state, to a baseband signal derived from said first radio frequency signal for producing an output signal indicative of said first channel being occupied or noisy;
- said handset including a controller for controlling said handset, a portion of said controller functioning as a signal detector responsive, during said on-hook state, to the frequency content of a baseband signal derived from said second radio frequency signal for producing a second output signal indicative of said first channel being occupied or noisy;
- said signal detector of said base unit and said signal detector of said handset each having a threshold of detection of a first value in said on-hook state and of a second value, higher than said first value, in said off-hook state;
- said signal detector of said base unit and said signal detector of said handset operating in said off-hook mode for detecting baseband digital control signals;
- said base unit controller, in response to said first output signal, causing a transmission of a command to said handset for causing said handset to change to a second channel, and causing said base unit to change to said second channel.

6. The cordless telephone set of claim 5, wherein each of said controllers monitors frequency content of a demodulated audio baseband signal to determine that the channel is occupied, the channel is noisy, or the channel is suitable for use.

7. The cordless telephone set of claim 6, wherein each of said controllers monitors frequency content of a demodulated audio baseband signal to determine that a second channel is occupied, noisy, or suitable for use before causing the transmission of said command to change to said second channel.

8. A cordless telephone set exhibiting an off-hook state for enabling communication via an external telephone network, and an on-hook state, said cordless telephone set comprising:
- a base unit and a handunit operating on one of a plurality of cordless telephone channels, each of said cordless telephone channels providing for communication between said handunit and said base unit via a base unit transmission frequency and a handunit transmission frequency;
- a monitoring circuit located in said base unit or said handunit for monitoring, during said on-hook state, the frequency content of a baseband signal derived from a respective one of said base unit transmission frequency or said handunit transmission frequency for producing an output signal indicative of said one cordless telephone channel being occupied or noisy;
- said monitoring circuit having a threshold of detection of a first value in said on-hook state and of a second value, higher than said first value, in said off-hook state;
- said monitoring circuit of said base unit and said monitoring circuit of said handunit operating in said off-hook mode for detecting baseband digital control signals;
- said cordless telephone set, in response to said output signal, causing said base unit and said handunit to change to a second cordless telephone channel.

9. The cordless telephone set of claim 8, wherein monitoring circuit monitors frequency content of a demodulated audio baseband signal to determine that a second channel is occupied, contains interference, or does not contain interference before causing the transmission of said command to change to said second channel.

* * * * *